Patented Nov. 30, 1943

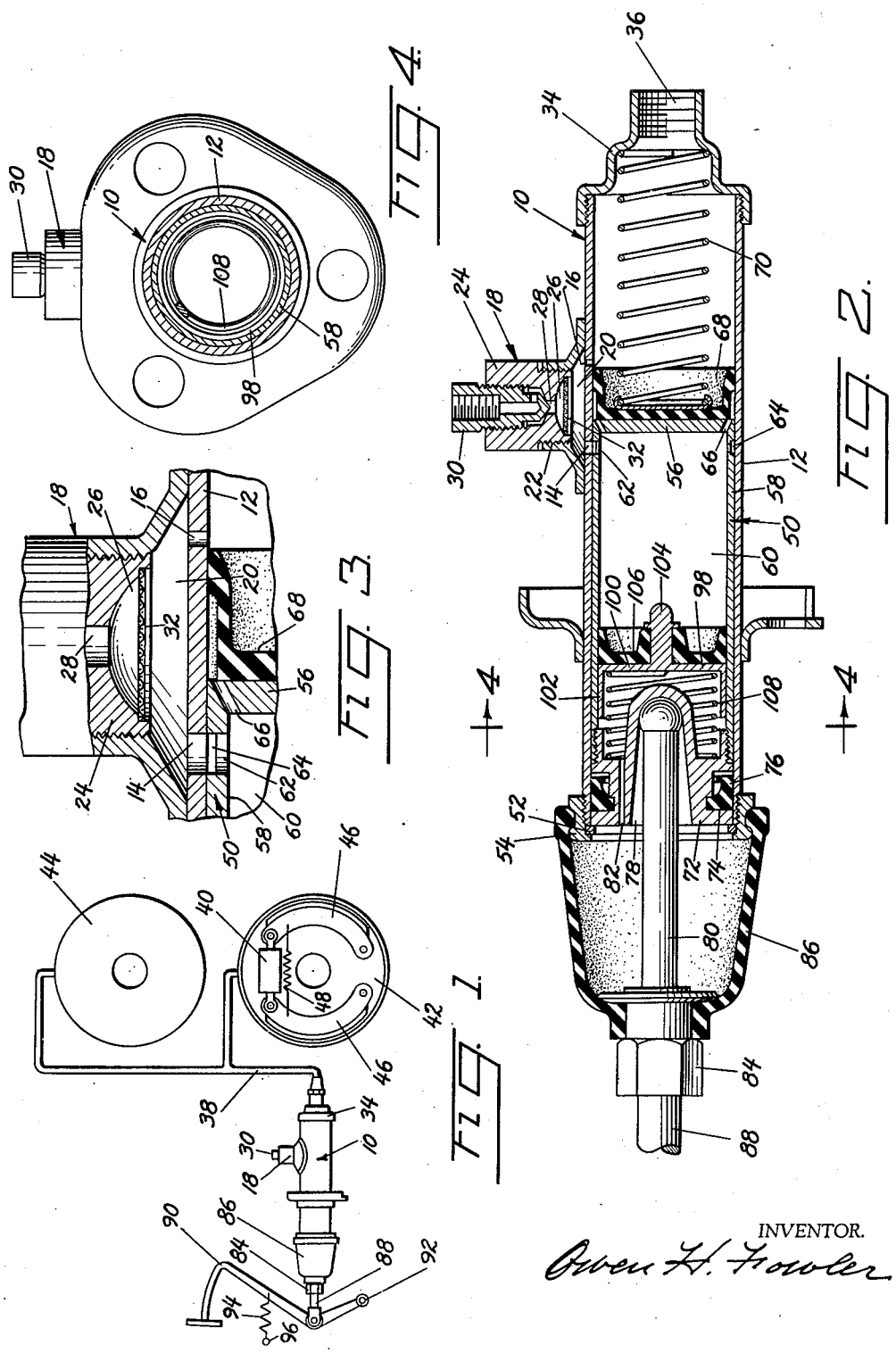

2,335,748

UNITED STATES PATENT OFFICE 2,335,748

FLUID PRESSURE PRODUCING DEVICE

Owen H. Fowler, Detroit, Mich., assignor to Hydraulic Brake Company, Detroit, Mich., a corporation of California Application October 13, 1941, Serial No. 414,848

11 Claims. (Cl. 60—54.6)

This invention relates to fluid pressure systems, and more particularly to fluid pressure producing devices for such systems.

It has been the general practice in the construction of fluid pressure producing devices to have an independent fluid reservoir communicating by way of ducts with a compression chamber. This general practice has not only necessitated great expense in the manufacture of such a device, but in addition has required a large space for its installation on aircraft or other motor vehicles. In such constructions the air accumulating in the system was, as a rule, collected within the reservoir above the liquid level, from which point it could be exhausted. The present invention aims to overcome several objections inherent in this practice.

An object of the invention is to simplify the structure of fluid pressure producing devices.

Another object of the invention is to provide a fluid pressure producing device including a piston having a reservoir in the body thereof.

Another object of the invention is to provide a fluid pressure producing device including a cylinder, a piston reciprocable in the cylinder, a reservoir chamber in the piston, and means providing communication between the reservoir chamber and that portion of the cylinder forward of the piston.

A further object of the invention is to provide a fluid pressure producing device including a cylinder, a piston reciprocable in the cylinder having a reservoir in its body, means providing communication between the reservoir and that portion of the cylinder forward of the piston, and means in the piston for maintaining a positive pressure on the fluid in the cylinder.

A further object of the invention is to provide means for collecting the air accumulated within the system and for exhausting such air. A meritorious feature is that such air is collected from the liquid as it flows through a passage in the operation of the device, and the passage may be between the reservoir and the compression chamber.

A further object of the invention is to provide, in a hydraulic system comprising a compression device receiving liquid from a reservoir wherein the liquid is maintained under pressure, a chamber of limited size wherein is collected a small amount of the liquid within which is trapped the air that accumulates in the system.

A further object of the invention is to provide a fluid pressure producing device operative to maintain a positive pressure on the fluid therein at all times.

Yet a further object of the invention is to provide a fluid pressure producing device including a compression chamber, a piston for producing pressure on the fluid in the chamber, a reservoir in the piston, means providing for flow of fluid between the reservoir and the compression chamber, and means for trapping and expelling any air in the fluid.

Still a further object of the invention is to provide a fluid pressure producing device having but few parts adapted to be easily and quickly assembled in a compact unit of high efficiency and durability.

Other objects and advantages of the invention will appear from the following description taken in connection with the drawing forming a part of this specification, and in which—

Fig. 1 is a schematic diagram of a fluid pressure producing system embodying the invention;

Fig. 2 is a longitudinal sectional view of the fluid pressure producing device;

Fig. 3 is an enlarged view of the air eliminator; and

Fig. 4 is a view, substantially on line 4—4 of Fig. 2.

Referring to the drawing for more specific details of the invention, 10 represents generally a fluid pressure producing device including a cylinder 12 having spaced ports 14 and 16 in its wall. A suitable connection 18 affixed to the cylinder and straddling the ports has a chamber 20 providing a communication between the ports and an opening 22 normally closed by a plug 24. The plug has a semi-spherical chamber 26 communicating with the chamber 20 and a port 28 closed as by a conventional bleeder screw 30, and fitted in the semi-spherical chamber 26 is a screen 32, preferably set back from the opening of the recess to provide a rim or ledge, the purpose of which will hereinafter appear.

One end of the cylinder is open, and its other end is closed by a head 34, provided with a discharge port 36. A fluid delivery pipe or conduit 38, suitably connected to the discharge port 36, has branches connected respectively to fluid pressure actuated motors 40 for actuating the brakes associated with the wheels of a vehicle.

The brakes may be of any preferred structure. As shown, each of the brakes includes a fixed support or backing plate 42, a rotatable drum 44 associated with the backing plate, a pair of corresponding interchangeable friction elements or shoes 46 pivotally mounted on the backing plate, a retractile spring 48 connecting the shoes, and a motor corresponding to the motors 40 mounted on the backing plate and connected to the shoes for actuating the shoes into engagement with the drum against the resistance of the retractile spring.

A piston 50 reciprocable in the cylinder 12 is held against displacement by a washer 52 secured on the open end of the cylinder by a collar 54, threaded on the cylinder. The piston includes a head 56, and a body portion 58 defining a reservoir chamber 60 having a port 62 communicating with an annular groove 64 adaped to register with the port 14 when the piston is in its retracted position, so as to provide communication between the reservoir 30 and that portion of the cylinder 12 forward of the piston. The head 56 of the piston has arranged therein a plurality of spaced ports 66. A sealing cup 68 seated on the head of the piston controls the ports, and a spring 70 interposed between the cup 68 and the head 34 of the cylinder serves to retain the cup against displacement and also to return the piston to retracted position.

A plug 72 threaded in the body portion of the piston 50 has an annular groove 74 providing a seat for a sealing cup 76 for inhibiting seepage of fluid past the piston, and a socket or recess 78 for the reception of a thrust pin 80. The plug also has an opening 82 therethrough providing a vent, the purpose of which will hereinafter appear.

A coupling 84 secured to the thrust pin 80 is connected by a flexible boot 86 to the open end of the cylinder for the exclusion of dust and other foreign substances from the cylinder, and a rod 88 connects the coupling to a foot pedal lever 90 pivotally mounted on a stub shaft 92 and connected by a retractile spring 94 to a fixed support 96.

A piston 98 reciprocable in the chamber 60 includes a head 100 and a skirt 102. The head has a concentrically extended portion 104 for the support of a sealing cup 106 for inhibiting seepage of fluid past the piston, and a spring 108 interposed between the back of the head 100 of the piston and the plug 72 imposes pressure on the fluid in the reservoir 60.

In a normal operation, upon depressing the foot pedal lever 90, force is transmitted therefrom through the rod 88 and thrust pin 80 to the piston 50, resulting in movement of the piston on its compression stroke. During the initial movement of the piston on its compression stroke, the cup 68 covers the port 16, and, thereafter, as the piston proceeds on its compression stroke, fluid in the cylinder 12 forward of the piston 50 is displaced therefrom through the discharge port 36, and the fluid delivery pipe 38 and its respective branches into the fluid pressure actuated motors 40, causing energization of the motors and the consequent actuation of the shoes 46 into engagement with the drums 44 against the resistance of the retractile springs 48 to effectively retard rotation of the drums.

Upon completion of a braking operation, the foot pedal lever 90 is released and returns to its retracted position under the influence of the retractile spring 94. This results in releasing the piston 50 and return of the piston to its retracted position under the influence of the spring 70 augmented by the pressure on the fluid in the system acting on the piston. As the piston 50 returns to its retracted position, a partial vacuum is created in the cylinder 12 forward of the piston 50 resulting in a rapid flow of fluid from the reservoir 60 through the spaced ports 66 in the head of the piston, past the sealing cup 68, into that portion of the cylinder forward of the piston, completely filling the cylinder. This rapid flow of fluid from the reservoir 60 to that portion of the cylinder forward of the piston is due to pressure imposed on the fluid in the reservoir 60 by the spring-pressed piston 98.

Simultaneously with this operation, fluid is returned to the cylinder from the motors 40, and the fluid pressure delivery pipe 38 and its respective branches, under the influence of the retractile spring 48 connecting the shoes 46 of the brakes. This results in the cylinder receiving a quantity of fluid in excess of its capacity, and such excess fluid is displaced therefrom through the port 16, the chamber 20, the port 14, the groove 64, and the port 62, into the reservoir chamber 60. This results in retraction of the piston 98, and, accordingly, the fluid in the system is again placed under a positive pressure, commensurate with the load of the spring 108. With the return of the piston 98 to its retracted position, any air that may have been present in the chamber 60 behind the piston is exhausted through the vent 82.

As the fluid returns from the cylinder to the reservoir 60, it flows through the chamber 20 under the screen 32 secured in the semi-spherical chamber 26. This screen defines a chamber of limited area in the uppermost part of the system wherein is collected liquid carrying the air that has accumulated in the system, as there is a tendency for the air carried by the liquid as it flows under the screen to collect upon and pass through the screen into the chamber 26. This rim or ledge surrounding the screen also serves to arrest any particles of air that might be present in the fluid as it flows under the screen.

By arresting of air is meant the taking into custody, staying and/or removal of the air from the fluid as it is borne in the fluid through the confined chamber 20. The action of arresting the air from the fluid by the screen 32 because of its roughened, highly-frictionalized surface, operates to filter the fluid in the system by changing the fluid from an aerated state to an air-free state and thereby provide for a more positive and safe operation of the device. The chamber 26, therefore, serves as a trap wherein is collected the air within the system in a relatively small amount of the liquid.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A fluid pressure producing device comprising a cylinder having spaced ports connected to one another outside of the cylinder, a hollow piston reciprocable in the cylinder, a reservoir in the hollow piston adapted to communicate with the cylinder by way of the ports when the piston is in retracted position, and means in the hollow piston imposing pressure on the fluid in the reservoir.

2. A fluid pressure producing device comprising a cylinder having a discharge port in one end and a pair of intercommunicating ports in its wall, a hollow piston reciprocable in the cylinder having a port in its wall registering with one of the ports in the wall of the cylinder when the piston is in retracted position, a reservoir in the piston communicating with the cylinder by way of the ports, and means in the reservoir imposing pressure on the fluid in the device.

3. A fluid pressure producing device comprising a cylinder having ports in its wall, means connecting the ports to provide communication therebetween, a bleeder screw in the connection, a piston reciprocable in the cylinder, a reservoir in the body of the piston communicating with the cylinder by way of a port in the wall of the piston, and a spring-pressed piston in the reservoir.

4. A fluid pressure producing device comprising a cylinder, a piston movable in the cylinder for producing pressure on the fluid therein, and means within the piston for imposing a positive pressure on the fluid in the cylinder when the piston is at rest, said pressure being conveyed from a point rearward of the piston through an external channel to a point forward of the piston.

5. A fluid pressure producing device comprising a cylinder, a piston reciprocable therein, a reservoir in the piston, means providing a confined communication between the cylinder and the reservoir, and means connected to the communication for arresting air borne by the fluid as it flows therethrough.

6. A fluid pressure producing device comprising a cylinder, a piston reciprocable therein, a reservoir in the piston, pressure producing means in the reservoir, means providing communication between the cylinder and the reservoir, and means connected to the communication for collecting and storing air.

7. A fluid pressure producing device comprising a cylinder, a piston reciprocable therein, a reservoir in the piston, a spring-pressed piston in the reservoir, a chamber outside of the cylinder providing a communication between the cylinder and the reservoir, and means in the chamber to provide a static stratum of fluid.

8. A fluid pressure producing device comprising a cylinder, a piston reciprocable therein, a reservoir in the piston, a spring-pressed piston in the reservoir, means providing for flow of fluid between the cylinder and reservoir, and means for impeding a portion of the flow to provide a static stratum of fluid.

9. A fluid pressure producing device comprising a cylinder, a piston reciprocable therein, a reservoir in the piston, means providing for flow of fluid between the cylinder and reservoir in one direction only, means providing for flow of fluid between the cylinder and reservoir in both directions, means for impeding a portion of the flow in both directions to provide a high velocity portion and a comparatively dormant portion, and means for venting the dormant portion.

10. A fluid pressure producing device comprising a cylinder, a piston reciprocable therein, a reservoir in the piston, means providing for flow of fluid between the cylinder and reservoir in one direction only, means providing for alternative flow of fluid between the cylinder and the reservoir, means in the reservoir for maintaining a positive pressure on the fluid in the cylinder and reservoir, means for impeding a portion of the alternate flow to provide a high velocity portion and a comparatively dormant portion, and means for venting the dormant portion at will.

11. A fluid pressure producing device comprising a cylinder, a piston reciprocable therein having a spring-loaded reservoir in its body, and a fluid de-aerating filter chamber providing communication between the reservoir and cylinder.

OWEN H. FOWLER.